(12) United States Patent
Carmincke et al.

(10) Patent No.: US 6,325,573 B1
(45) Date of Patent: Dec. 4, 2001

(54) ARRANGEMENT OF A HOBBING CUTTER AND HOLDING ARBOR

(75) Inventors: Wolfgang Carmincke, Scharnebeck; Christian Davids, Büchen; Andreas Ebert, Nusse; Jürgen Hinzpeter, Schwarzenbek; Werner Kölker, Ratzeburg; Wolfram Lämmerhirt, Schwarzenbek; Ansgar Pleus, Schwarzenbek; Meinhard Schadowski, Schwarzenbek; Wolfgang Soltau, Neu Darchau; Gerhard Steffen, Mölln, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/471,216

(22) Filed: Dec. 23, 1999

(30) Foreign Application Priority Data

Dec. 28, 1998 (DE) .................................. 198 60 403

(51) Int. Cl.⁷ .............................. B26D 1/12; B23F 21/16
(52) U.S. Cl. ........................ 407/23; 407/25; 407/30; 82/158
(58) Field of Search .......................... 407/23, 24, 25, 407/26, 27, 28, 29, 30; 82/158, 160, 161, 168; 409/231; 279/4.09; 408/238

(56) References Cited

U.S. PATENT DOCUMENTS

| 1,142,362 | * | 6/1915 | Petz | 188/68 |
| 1,202,195 | * | 10/1916 | Lees | 407/24 |
| 2,089,410 | * | 8/1937 | Olson | 407/23 X |
| 2,930,110 | * | 3/1960 | Glodde | 407/29.12 |
| 4,373,650 | * | 2/1983 | Gay | 225/97 |
| 4,378,660 | * | 4/1983 | Wiener | 225/97 |
| 5,302,062 | * | 4/1994 | Baba et al. | 409/231 |

* cited by examiner

Primary Examiner—Henry Tsai
(74) Attorney, Agent, or Firm—Vidas, Arrett & Steinkraus, P.A.

(57) ABSTRACT

An arrangement comprising a bore-type hobbing cutter and a holding arbor wherein the bore of the hobbing cutter has ground cylindrical centering surfaces at its ends and the arbor has complementary seating surfaces and wherein the hobbing cutter is axially chucked on the holding arbor by means of axial chucking means, where a preferably sleeve-shaped cage is disposed between centering surfaces and has a thickness which is smaller than the radial distance between centering and seating surfaces, and has an outside diameter which is smaller than the inside diameter of centering surfaces, the cage supports, in a circumferential direction, at least a number of prechucking elements, which are preferably metallic and are in contact with the associated centering surface and the seating surface, and said diameter and the distance between the contacting points or contacting lines of prechucking members are slightly larger than the radial distance between centering and seating surfaces.

6 Claims, 2 Drawing Sheets

ARRANGEMENT OF A HOBBING CUTTER AND HOLDING ARBOR

BACKGROUND OF THE INVENTION

The invention relates to an arrangement comprising a bore-type hobbing cutter and a holding arbor.

As far as the receptacle is concerned in a hobbing machine, a distinction is made between a hole type and a shank type. The cutter body, when of a bore-type design, has a centric hole with a longitudinal groove for positive torque transfer. In this case, a key is disposed in a groove of the holding arbor to interact with the longitudinal groove of the cutter hole. It is also known, however, to cause the cutter hole to intersect a transverse groove at its front-end face to obtain positive torque transfer. In the end, it is also known to obtain positive torque transfer via the front-end face.

The shank-type design has both the cutter body and conical or cylindrical shanks integrally formed at the ends of the cutter body. As a rule, a tool of such a sturdy structure features very high concentricity in running. It is unnecessary to pre-align it on the cutter arbor. A disadvantageous feature, however, is the high expenditure, particularly when the cutter is completely made of cemented carbide. Cutters made from hard material are extremely sensitive to shocks and bumps. When the cutter is damaged it frequently needs to be exchanged.

The most widespread type of hobbing cutters is the bore-type design having a longitudinal groove. These are accommodated by a standard-type holding arbor. The bore has ground centering surfaces, e.g. cylindrical surfaces, in the two end regions, each of which extends over approximately one third of the cutter body length. (It is also known to precisely grind them across the entire wall of the bore, but it requires more machining expenditure). The holding arbor has matching cylindrical, ground seating surfaces. Since the cutter body is slid onto the holding arbor minimal looseness is required between components. This will naturally interfere with concentricity in running. After assembly, there is a need to verify concentricity in running on testing collars of the cutter body which are provided for this purpose. If it does not exist below the tolerance limit prescribed it is common for an operator to align the tool and to effect radial relative displacement between the cutter body and holding arbor for a time until the desired concentricity in running is achieved. In any case, however, the concentricity in running of conventional bore-type hobbing cutters is significantly lower than that of a shank-type design.

It is an object of the invention to create an arrangement of a hobbing cutter and a holding arbor which enables concentricity in running which is as high as that of shank-type hobbing cutters, but avoids the disadvantages of this design.

BRIEF SUMMARY OF THE INVENTION

The inventive design provides a sleeve or cage which is disposed between the centering surface of the hobbing cutter and the seating surface of the holding arbor. In an aspect of the invention, two separate cages may be provided each of which is disposed in the region of centering surfaces, or a continuous sleeve-shaped cage which extends through the entire bore of the hobbing cutter. The thickness of the cage is smaller than the radial distance between the centering surface and seating surface. The cage accommodates, in a circumferential direction, at least a number of prechucking members, which are preferably metallic and are in contact with the associated centering surface and seating surface. The contact may be punctiform or line-like, but also circular or elliptical. At this point, the diameter or the distance between the contacting points or contacting lines of prechucking members is slightly larger than the radial distance between the centering and seating surfaces.

The design of the cage must be such as to meet the requirements described, namely to ensure accommodation of prechucking members. It is particularly advantageous to use a sleeve, preferably a metallic one.

When inserting the sleeve-shaped cage in between the holding arbor and hobbing cutter a relatively slight elastic deformation will occur on the prechucking members. Since a number of prechucking members are circumferentially disposed on the cage in a spaced relationship, preferably at equal circumferential spacings, the hobbing cutter will undergo automatic centering on the holding arbor. There is no need to test the cutter body for concentricity in running and, perhaps, to align it in a radial direction subsequently. Hence, the inventive arrangement makes possible a hobbing cutter the characteristics of concentricity are as good as those of a shank-type hobbing cutter, but which avoids the disadvantages thereof. Thus, the hobbing cutter of the inventive arrangement is considerably smaller in weight than a shank-type hobbing cutter. Hence, the hobbing cutter according to the invention is easier to handle. In addition, it is considerably less expensive with regard to material use than shank-type hobbing cutters are.

The prechucking members are preferably formed by spheres or rollers. When rollers are used there is a line-like contact, for example, between the cylindrical surfaces of the hobbing cutter and holding arbor.

Furthermore, the inventive arrangement has the advantage that the ground centering surfaces disposed at the ends of the bore need a relatively small axial extension which is clearly shorter than a third of the hobbing cutter length as it is known for conventional bore-type hobbing cutters. The undercut, which preferably joins the ground centering surface in an inward direction, may be kept considerably longer in the inventive arrangement than is the case for the known design. Accordingly, the manufacture of the inventive hobbing cutter is also easier and requires less expenditure than that of conventional bore-type hobbing cutters.

Alternatively, in lieu of a sleeve-shaped cage having prechucking members, a chucking sleeve may be provided which is hydraulically expandable in a radial direction and, when unchucked, has a thickness which is smaller than the radial distance between the centering and seating surfaces. The chucking sleeve may have a circularly extending toroidal chamber or a plurality of circumferentially disposed, spaced-apart chambers into which a hydraulic medium may be passed under a pressure, which will cause the sleeve to expand inwardly and outwardly in a radial direction. It yields the same centering effect as the described sleeve-shaped cage does which has prechucking members.

It is particularly advantageous in the inventive arrangement to machine the hobbing cutter on an equal-system arbor. After forming the bore and the above-mentioned cylindrical centering surfaces at the ends of the bore the hobbing cutter will be mounted, for further manufacture, on a machining arbor which, in turn, has cylindrical seating surfaces. The hobbing cutter is then centered on the machining arbor by means of the sleeve-shaped cage which was described earlier. All the subsequent machining steps up to the final manufacture of the hobbing cutter may then be carried out on this arbor. The mounting of the hobbing cutter on the machining arbor may be effected in a way similar to that for the holding arbor in the milling machine, i.e. by means of a hydraulic chucking nut which is screwed onto the arbor. Applying a hydraulic pressure to a hydraulic medium will cause a section of the nut to be forced against the hobbing cutter's front-end face directed to the nut, preferably via an intermediate ring, in order to axially hold the hobbing cutter against an abutment surface on the arbor. As mentioned earlier, it is unnecessary to perform a concentricity test.

The fact that the hobbing cutter is manufactured on the machining arbor described also helps decisively improve the milling result. The possibility of an exchange between different hobbing cutters and arbors is ensured while concentricity in running is maintained.

The inventive arrangement permits to internally cool or preheat the hobbing cutter with a view to leveling out stresses and changes to dimensions that result from the build-up of heat during the milling process.

In an aspect of the invention, the seating surfaces of the machining and holding mandrels are defined by sockets which are heat-shrunk or adhesively bonded onto the arbor. This aspect has the advantage that the arbor need not be discarded as a whole when the seating surface is damaged. Instead, the sockets may be removed and replaced with others.

BRIEF DESCRIPTION OF THE DRAWINGS

The invention will now be described in detail with reference to the embodiments shown in the drawings.

DETAILED DESCRIPTION OF THE INVENTION

Figure 1:
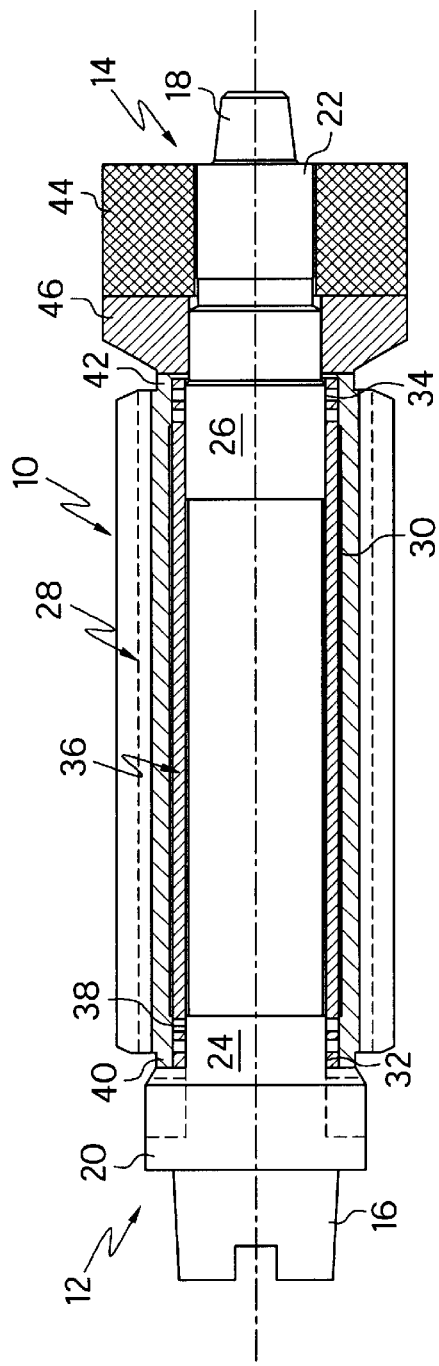
FIG. 1 shows a first cross-section of a first embodiment of an arrangement according to the invention.

The arrangement shown in FIG. 1 comprises a hobbing cutter 10, a holding arbor 12 of a milling cutter and a chucking device 14. The holding arbor 12 is of a conventional configuration and has chucking cones 16, 18 at its ends, a stop collar 20 at an end adjacent to cone 16 as well as a threaded portion 22 adjacent to cone 18. In addition, the shank portion located between cones 16, 18 has two cylindrical seating surfaces 24, 26 which are precisely ground.

The hobbing cutter 10, the tool portion 28 of which is conventional, has a central through bore which has its ends fitted with cylindrical centering surfaces 32 and 34, respectively. The diameter of centering surfaces 32, 34 is somewhat smaller than that of the rest of bore 30 so that the rest of the bore may also be regarded as an undercut.

As can further be seen from FIG. 1 a sleeve-shaped cage 36 is disposed in the bore 30. It is of uniform thickness over its length that is smaller than the radial distance between seating surfaces 24, 26 and centering surfaces 32, 34. In addition, it is of an outside diameter which is slightly smaller than the inside diameter of centering surfaces 32, 34, and an inside diameter which is slightly larger than the outside diameter of seating surfaces 24, 26. The cage 36 has fitted at its ends two rows each of spheres 38 which are accommodated at a uniform circumferential spacing in corresponding radial bores of the sleeve-shaped cage 36. The diameter of spheres 38 is larger than the thickness of cage 36 and is slightly larger than the radial distance between seating surfaces 24, 26 and centering surfaces 32, 34. Thus, the spheres are elastically deformed between the surfaces and will precisely center the cutter 10 with regard to the holding arbor 12. This maintains a high concentricity in running. The concentricity test is known to be performed at the circumferential surface of testing collars 40, 42.

The prechucking device 14 has a nut 44 which is tightenable hydraulically and is screwed onto threaded portion 22. A portion of nut 44 (not shown here) is adapted to be axially shifted towards hobbing cutter 10 by passing in a hydraulic medium under a pressure via a connection (not shown here). Accordingly, hobbing cutter 10 is held against the abutment collar 20 via an intermediate ring 46 at a pressing force which is more or less high. This way will not only fix the axial position of cutter 10, but also produce the transfer of torque in a non-positive way.

Figure 2:
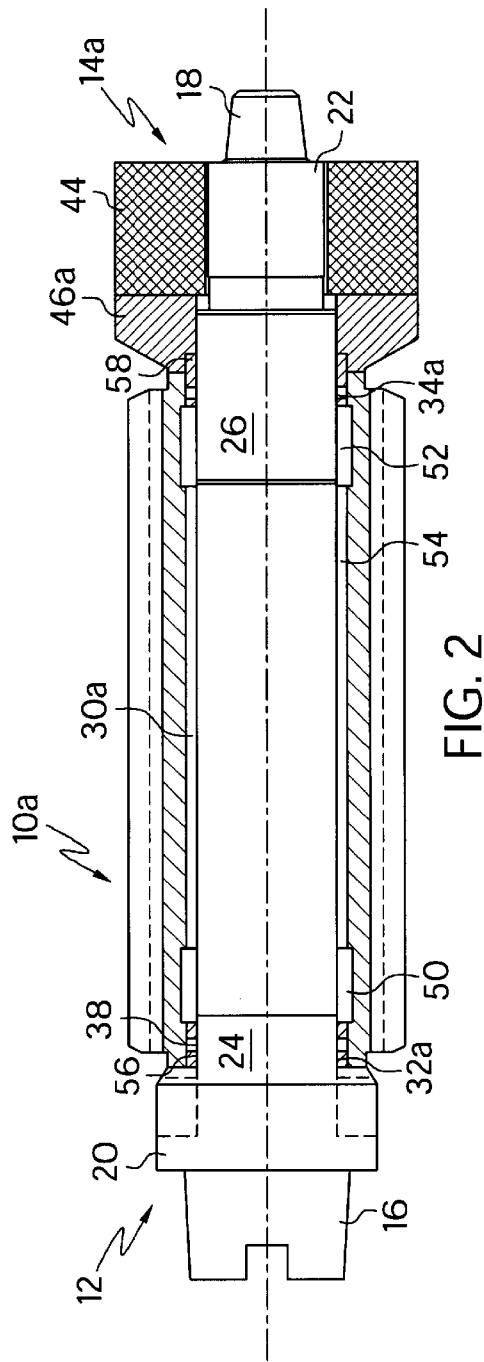
FIG. 2 shows a second cross-section of a first embodiment of an arrangement according to the invention.

As far as the embodiment according to FIG. 2 illustrates parts which agree with those shown in FIG. 1 like reference numbers are used.

Again, the through bore 30a of hobbing cutter 10a has its ends fitted with cylindrical centering surfaces 32a, 34a which are inwardly followed by turned grooves 50, 52 and a middle bore portion 54. This embodiment provides two sleeve-shaped cages 56, 58 which are relatively short and the length of which is only slightly larger than the axial extension of centering surfaces 32a, 34a. Sleeve 58 is longer than sleeve 56. It protrudes beyond the associated end of hobbing cutter 10a into a recess of intermediate ring 46a which, like ring 46, is held by the hydraulic nut 44 against the associated front-end face of cutter 10a. Each sleeve-shaped cage 56, 58 has a number of spheres 38 which are disposed at a uniform circumferential spacing in radial bores of the cage. The way of action of cages 56, 58 and even the geometrical relationships as referred to the centering and seating surfaces are completely equal to those of the sleeve-shaped cage 36 shown in FIG. 1.

Figure 3:
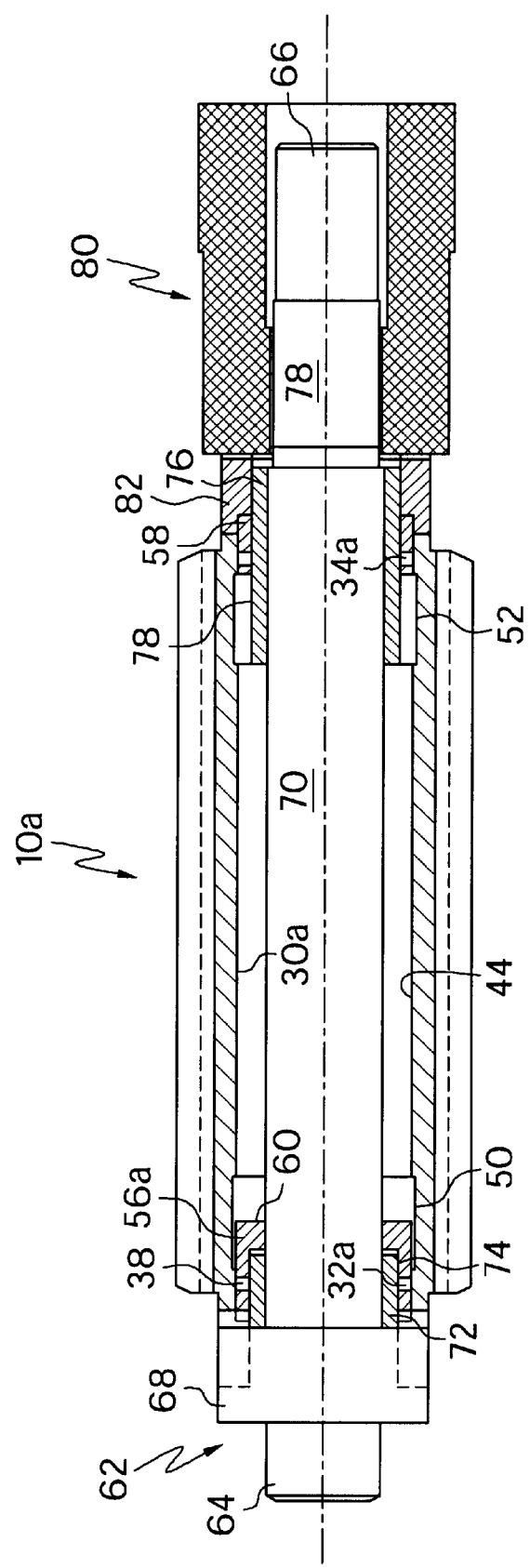
FIG. 3 shows a second cross-section of a first embodiment of an arrangement according to the invention.

The arrangement of FIG. 3 uses a hobbing, cutter 10a which equals the one shown in FIG. 2. Hence, like reference numbers as in FIG. 2 are used as far as they illustrate like elements. Even the sleeve-shaped cage 58 at the right-hand end corresponds to that of FIG. 2. The left-hand sleeve-shaped cage 56a has an inwardly facing collar 60. Shown in FIG. 3 is a holding arbor 62 which differs from the holding arbor 12 of FIG. 1 and FIG. 2. The arbor shown here is a machining arbor for the manufacture of hobbing cutter 10a. Arbor 62 has fitted at its ends cylindrical journals 64, 66 which are suited for accommodation by centers in the individual machining stations. After the cylindrical journal 64, a radial collar 68 is defined as an abutment for hobbing gear 10a. Adjacent to the abutment collar 68, on the relatively slender shank 70 between journals 64, 66, a socket 72 is mounted by shrinking or adhesive bonding, for example, the circumferential surface 74 of which defines a seating surface which corresponds to the seating surface 24 of the embodiment of FIGS. 1 and 2. Adjacent to journal 66, another socket 76 is mounted on the shaft 70 by shrinking or adhesive bonding. Socket 76 defines a cylindrical seating surface 78. Sockets 72, 76 may be substituted for when the associated seating surfaces are damaged and are no longer suited for machining. As to their function, they equal the seating surfaces of the holding arbor of FIGS. 1 and 2. Therefore, it is unnecessary to describe in detail how to dispose hobbing cutter 10a on machining arbor 62.

Seated on a threaded portion 78 of shank 70 is a hydraulic nut 80, which is adapted to generate a tension in an axial direction as has been described already in conjunction with nut 44. Accordingly, it generates an axial pressing force on cutter 10*a* via an intermediate ring 82. The intermediate ring accommodates cage 58 in a recess. Socket 72 is seated in a circular recess of abutment collar 68. The radial collar 60 of cage 56*a* prevents any motion of cage 56*a* which is undesirable.

After bore 30*a* and the associated seatings 32*a*, 34*a* are made the premachined hobbing cutter 10*a* or the preformed body are chucked onto the machining arbor 62 as described and may then pass through all machining stations. This ensures high precision for the hobbing cutter 10*a*, and its concentricity in running is maintained as for the arrangement on an arbor 12 as shown in FIGS. 1 and 2.

What is claimed is:

1. An assembly comprising:

a hobbing cutter having an axial throughbore and a holding arbor extending through the throughbore, wherein the ends of the throughbore of the hobbing cutter have cylindrical centering surfaces made by a grinding operation;

the arbor having complementary seating surfaces, with a radial space between the centering and the seating surfaces;

axial chuck means adapted to axially clamp the hobbing cutter onto the arbor;

a sleeve-shaped cage (36, 56, 56*a*, 58) being disposed between the centering surfaces (32, 34, 32*a*, 34*a*) and the seating surfaces, the cage having a thickness which is smaller than the radial space, and the cage having an outside diameter which is smaller than the inside diameter of centering surfaces (32, 34, 32*a*, 34*a*), the cage (36, 56, 56*a*, 58) supporting, in a circumferential direction, at least two metallic chuck members (38), which are adapted to be moved radially with respect to the cage and are in contact with the associated centering surface and the seating surface, and the radial extension of the chuck members being slightly larger than that of the radial space so that the chuck members are slightly deformed and clamped between the centering and seating surfaces in order to center the hobbing cutter on the holding arbor.

2. The assembly according to claim 1, characterized in that the chuck members (38) are spheres or are cylindrical, conical or barrel-shaped rollers.

3. The assembly of claim 1, characterized in that the cage (36) extend approximately over the length of the throughbore (30) of hobbing cutter (10).

4. The assembly of claim 1, characterized in that the length of a cage (56, 58, 56*a*) is equal to or somewhat larger than that of centering surfaces (32*a*, 34*a*).

5. The assembly of claim 1, characterized in that the throughbore (30*a*) of hobbing cutter (10*a*) has an undercut (50, 52) at the inner surface of centering surfaces (32*a*, 34*a*).

6. The assembly claim 1, characterized in that the seating surfaces are defined by sockets (72, 74) which are fixed to the arbor (62).

\* \* \* \* \*